United States Patent [19]
Mongeau

[11] Patent Number: 4,914,265
[45] Date of Patent: Apr. 3, 1990

[54] EXTERIOR COVER FOR AN ELECTRICAL SOCKET OR SWITCH

[75] Inventor: François Mongeau, Ile Bizard, Canada

[73] Assignee: Nicolet Plastique LTEE, Nicolet, Canada

[21] Appl. No.: 227,270

[22] Filed: Aug. 3, 1988

[51] Int. Cl.⁴ .................. H01R 13/44; H01H 9/04; H01H 3/20

[52] U.S. Cl. .................... 200/330; 200/331; 200/332; 200/337; 174/67; 439/136; 439/140; 439/149

[58] Field of Search ............... 200/330, 331, 333, 337, 200/338; 174/66, 67, 52.1, 53; 439/135, 136, 142, 140, 141, 143, 145, 147, 149

[56] References Cited

U.S. PATENT DOCUMENTS

| 2,382,738 | 8/1945 | Moyses | 200/330 |
| 2,571,837 | 10/1951 | Coles | 200/330 |
| 3,188,439 | 6/1965 | Fullerton | 200/331 |
| 3,778,577 | 12/1973 | Fromknecht et al. | 200/333 X |
| 3,816,686 | 6/1974 | Budd et al. | 200/330 |
| 4,105,884 | 8/1978 | Damsky | 200/331 |
| 4,427,864 | 1/1984 | Oster | 200/330 |
| 4,731,511 | 3/1988 | Steinhilber et al. | 200/330 |
| 4,760,227 | 7/1988 | Boxer | 200/330 |
| 4,793,818 | 12/1988 | Poirier | 439/140 |
| 4,798,916 | 1/1989 | Engel et al. | 174/67 |
| 4,810,833 | 3/1989 | Meyers | 174/67 |

Primary Examiner—Ernest G. Cusick
Attorney, Agent, or Firm—Edwin E. Greigg

[57] ABSTRACT

New cover assemblies for electrical fixtures in buildings allow conventional outlets and (toggle) light switches to be cheaply converted into a variety of different color designs and/or colors without changing the electrical infrastructure of the fixture. The cover assemblies comprise a cover plate with an appropriate number of orifices, each orifice being covered by a slider so that the whole cover assembly shields the conventional parts of the fixtures normally visible in building interiors.

11 Claims, 6 Drawing Sheets

EXTERIOR COVER FOR AN ELECTRICAL SOCKET OR SWITCH

FIELD OF THE INVENTION

This invention relates to an exterior cover assembly for an electrical component box where the component may be an ordinary toggle switch or electrical outlet sockets.

DESCRIPTION OF THE PRIOR ART

Conventional toggle switches and electrical outlet sockets of standard configuration are ubiquitous in North America. Generally such electrical components are affixed in electrical boxes attached to the wall studding so that the outward facing side of the box is approximately flush with the surface of the wall.

The outlet commonly found in North American buildings is a "duplex receptacle" (i.e. double outlet) having two faces each describing circles cut by parallel chords to give the appearance of rectangles having two opposite rounded ends.

The plate designed to cover such outlets naturally has (in this example) two holes corresponding in size and position to the faces of the outlets. Thus, placement of the cover plate on the wall over the box shields all the unsightly elements of the outlets to present a tidy finish while allowing access to the outlet sockets.

In the case of toggle switches (used mostly as light switches), the cover plate has a rectangular orifice to allow passage of the switch actuator itself (i.e. the manually operated part of the switch) while covering the remaining, aesthetically undesirable elements of the switch mechanism.

In both cases the electrical component in question has one or more standard screw holes for alignment with corresponding holes in the cover plate. The position of these holes is invariable in a given component. For instance in the double outlet, the screw hole is always centrally positioned equidistantly from each hole. In the toggle switch there are habitually two such holes one above and one below the switch actuator in the centre of the plate.

One of the problems encountered by interior designers seeking to modernise or somehow alter the outward appearance of such standard electrical installations, is that the existing infrastructure of the electrical components is so established as to impede substantial design changes to the installations themselves.

The alternative is to modify the visible portions only of the fixtures in question. In this regard, it has recently become possible to make use of colored cover plates so that a designer may incorporate (for instance) red light switch cover plates to suit a room having a red carpet.

Unfortunately in such cases the toggle switch activator itself, being part of the switch mechanism, cannot simply be changed and so the color of the actuator (which remains visible after application of the cover plate) often conflicts with that of the plate. Even if it were possible to obtain a variety of colored switch actuators, changing the color would involve total replacement of the switch mechanism, a time-consuming, skilled and expensive operation.

The problem is similar with outlet sockets where the "rounded-rectangular" faces of the outlets (being part of the component's infrastructure) remain visible in their original color (usually only brown, cream or white) even when a cover plate of different color has been applied.

It is clear therefore that there is a need to find a means of covering existing interior electrical components in a way which makes use of the existing electrical infrastructure while occluding those portions (normally visible) which would conflict aesthetically with a cover plate of a different color or design.

There exists a device for converting a light switch (usually at shoulder height) for use by children by attaching a rigid cable having a loop on its upper end to slip over the switch actuator. The cable and loop are enclosed by a conduit affixed outward of the wall and extending down the wall until a point where the cable is exposed for a child to operate the device which he does by manually pulling down or pushing up the rigid cable to switch the light.

However, clearly the premise of this device in seeking to render a light switch operable by children, does not address the broader problem of interior design difficulties presented by the above discussed infrastructural standardisation.

OBJECTS OF THE INVENTION

It is therefore an object of the present invention to provide an exterior cover assembly for an electrical box containing an electrical component wherein the existing electrical infrastructure is retained and yet the normally invisible parts of this infrastructure are obscured by such a cover assembly.

It is a further object to provide a cover assembly for a toggle switch to facilitate conversion of existing switch emplacements into emplacements of different but homogeneous design particularly homogeneous color.

Another object is to provide a cover assembly for outlet sockets where the normally visible face of the outlets themselves is obscured by an integral cover assembly of homogeneous design and preferably homogeneous color.

SUMMARY OF THE INVENTION

In meeting the foregoing and other objects, the present invention provides an exterior cover assembly for an electrical box containing at least one electrical component having at least one standard screw hole, the assembly comprising:
- a cover plate having one standard orifice for each electrical component in the box; and having a standard screw hole, for each standard screw hole in the electrical component;
- a slider, mounted over each orifice forward of the cover plate;
- a first guide means on the cover plate,
- a second guide means on the slider; and
- a clip for retaining the first guide means in sliding relationship with the second guide means to allow guided, rectilinear displacement of the slider in a plane parallel to the plate.

A second, more specific provision of the invention is an exterior cover assembly for an electrical box containing a domestic double outlet (or "duplex receptacle") unit of standard design, the unit having two outlets respectively equidistantly above and below a central standard screw hole in the unit, the assembly comprising:
- a cover plate having two standard orifices, one for each outlet and having a standard central screw hole, registerable with the standard screw hole in the outlet unit;

two identical sliders, mounted over each orifice forward of the cover plate, each slider being moveable, relative to the central screw hole, from a proximal to a distal rectilinearly interchangeable position, the orifices being closed when the sliders are at their proximal positions and open at their distal positions;

a first guide means on the cover plate, a second guide means on the sliders; and a clip for retaining the first guide means in sliding relationship with the second guide means to allow guided, reversible, rectilinear displacement of each slider in a plane parallel to the plate from the proximal position to the distal position.

A third particular provision of the present invention is an exterior cover assembly for an electrical box containing at least one toggle switch unit of standard design having two centrally positioned standard screw holes respectively above and below and equidistant from a switch actuator residing in one of two rectilinearly interchangeable positions, the switch being off in one position and on in the other position, the assembly comprising:

a cover plate having one standard, rectangular orifice for passage of each switch actuator and having two corresponding standard screw holes per unit;

a slider mounted over and completely covering each orifice forward of the cover plate so that an inner face of the slider faces the plate;

a first guide means on the cover plate, a second guide means on the slider; and a clip for retaining the first guide means in sliding relationship with the second guide means to allow guided, rectilinear displacement of the slider in a plane parallel to the plate; and wherein:

the inner face of the slider additionally comprises a cavity for accommodating the switch actuator such that the abovementioned rectilinear displacement causes the actuator to move from one of its positions to the other of its positions.

In each of the above three provisions, it is preferred that the second guide means mentioned is a pair of parallel tongues extending rearwardly from, and along at least a portion of, the inner face of the slider. Likewise it is preferred that the first guide means mentioned above is a pair of parallel grooves bilaterally flanking the orifice (or orifices). These tongues fit into the grooves to allow rectilinear sliding motion of the slider relative to the plate.

Further objects, the advantages and other features of the present invention will become more apparent upon reading the following non-restrictive description of preferred embodiments thereof, made with reference to the accompanying drawings; in which.

DESCRIPTION OF THE PREFERRED EMBODIMENTS

Figure 5:
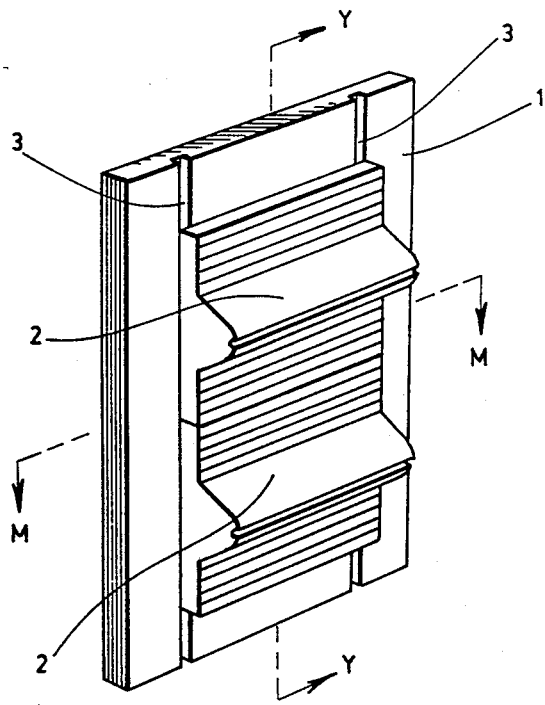
FIG. 5 is a perspective view of a second embodiment.

In what follows, the same reference numerals apply to all figures, and, where appropriate, the numeration "10" (for example) implies "10a and/or 10b" or "10 and 10'".

Figure 1:
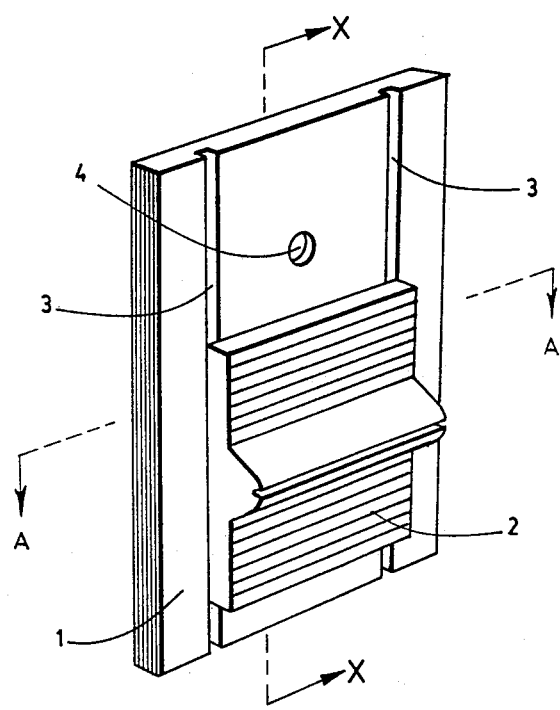
FIG. 1 is a perspective view of one embodiment.
Figure 3:
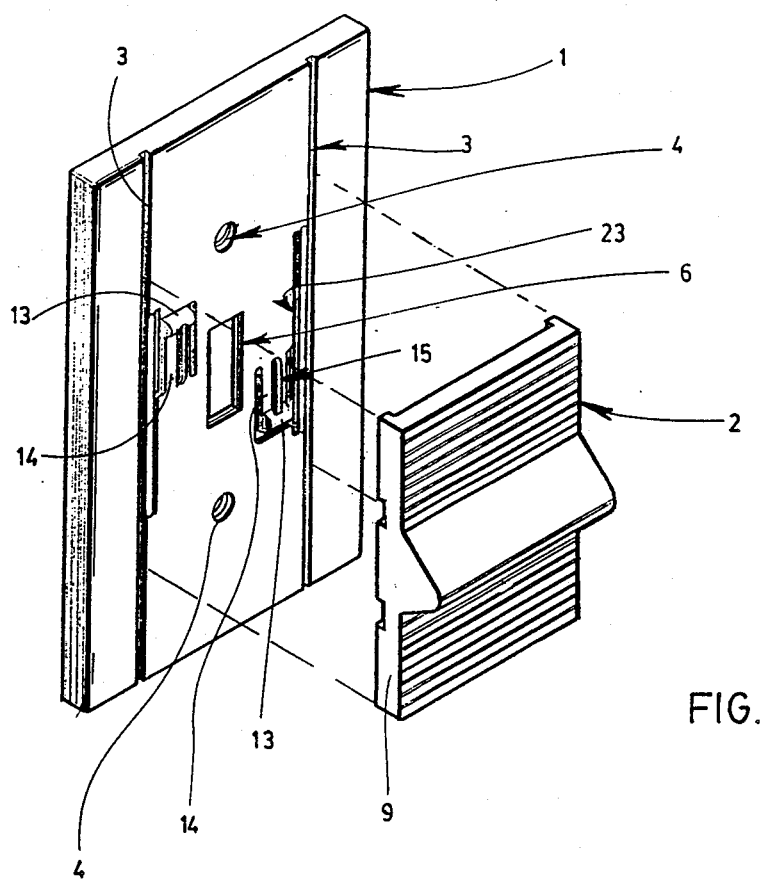
FIG. 3 is an exploded view of the embodiment of FIG. 1.

Referring to FIGS. 1 and 3, a cover assembly suitable for a single toggle switch is shown. The cover plate (1) has a pair of parallel grooves (3) forming the abovementioned first guide means. Into these grooves fit corresponding tongues (5) extending rearwardly from the reverse face of the slider (2)—see FIG. 4. These tongues (5) are the second guide means referred to above and they may be a single pair of tongues running the length of the slider or they may comprise more than one pair of tongues extending over portions of the length.

The rectangular orifice (6) is correctly sized for the passage of a switch actuator (not shown) and there are two standard screw holes (4) for attachment of the cover plate (1) to the switch unit (not shown).

Figure 2:
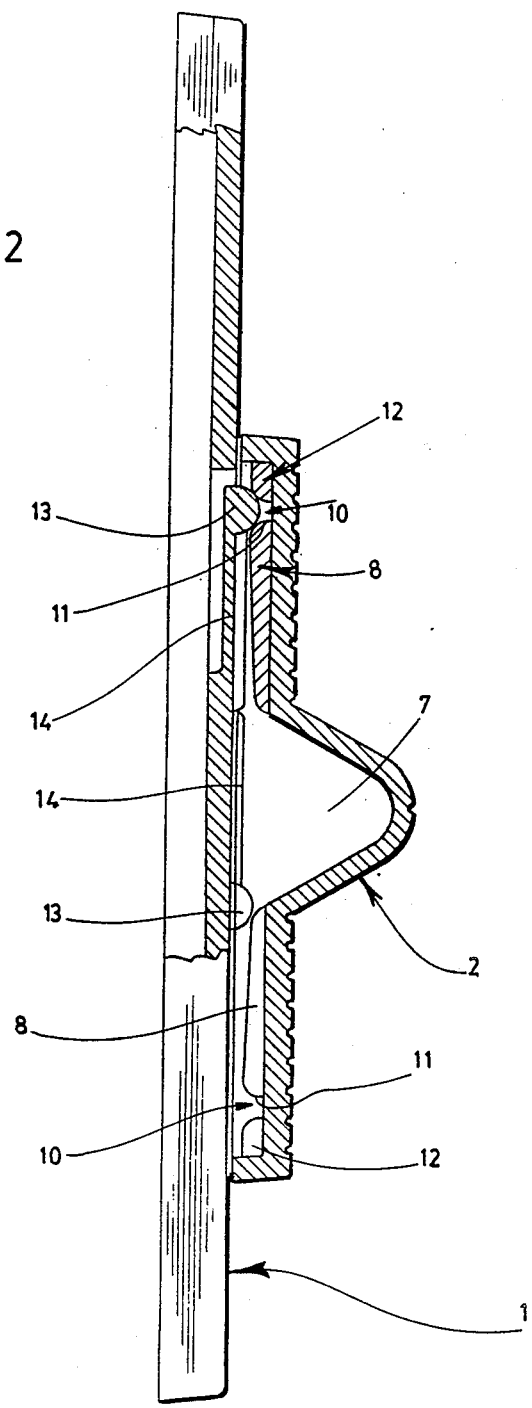
FIG. 2 is a cross-sectional view along the line XX of FIG. 1.
Figure 4:
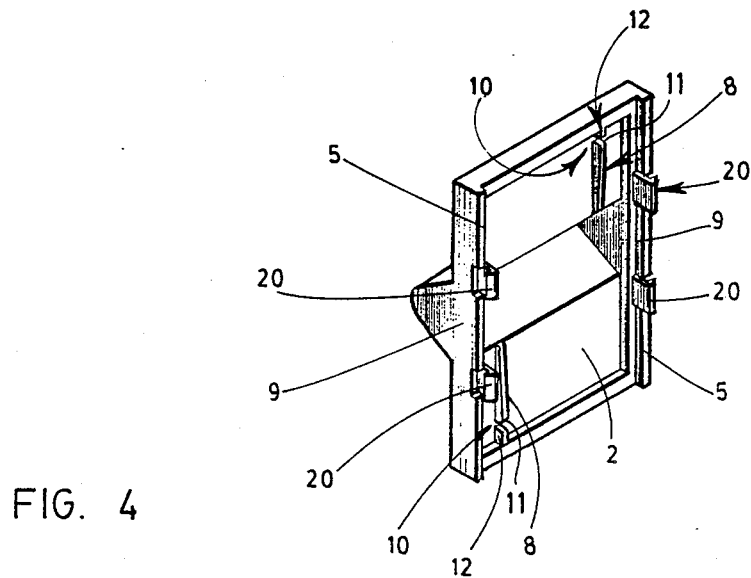
FIG. 4 is a reverse perspective view of the slider shown in FIG. 3.

As may be seen in FIGS. 2 and 4, the slider (2) possesses an opening (7) (on its inner face) for accommodation of the switch actuator which projects forward of the plate (i.e. through the orifice (6)) when the plate is fixed in position. This opening (7) is preferably situated at the mid point of the plate's longitudinal axis and it (the opening) is so sized as to contact the switch actuator (not shown) when the slider (2) is moved in either direction. By this means, the switch actuator is caused to move, as it normally does when directly operated by hand, from its "off" position to its "on" position (or vice versa).

It is generally preferred that the slider be moveable between two positions which are rectilinearly interchangeable. In other words that there be a defined "off" or "closed" position and a defined "on" or "open" position for the slider (relative to the plate) corresponding to the two positions of maximum rectilinear displacement from an equilibrium position which, for the switch assembly, is when the opening (7) is directly above (forward) of the orifice (6).

The terms "above", "below", "vertical", "forward", "rearward", "inner", etc are terms used for descriptive convenience only and are not intended to restrict the generality of the invention which clearly applies to electrical fixtures however they may be oriented.

The interacting surfaces of the plate (1) and the slider (2), in the general case, incorporate a device for establishing the two above mentioned rectilinearly interchangeable positions of maximum displacement. On the slider (2), this device is a first cam means (on the inner face of the slider) which interacts with a second cam means on the plate. These means are thus able reversably to retain the slider in either one of the two rectilinearly interchangeable positions.

Returning to the embodiment of FIGS. 2, 3 and 4, the first cam means (on the slider (2)) comprises a pair of diametrically opposed ribs (8) projecting rearwardly from the inner face of the slider (2) and parallel to the above mentioned tongues and also (in the illustrated case) parallel to the vertical edges (9) of the slider (2).

Each rib slopes from a central portion of the slider, near the opening (7), to reach a maximum rearward extent (11) adjacent to a respective valley (10). Each valley (10) is defined by opposing convex sides on the maximum rearward extent (11) of each rib and on an end abutment (12) on the inner surface of the slider (2).

The second cam means (on the plate (1)) comprises a pair of diametrically opposed rounded bosses (13) each such boss being disposed on the end of a resiliently deformable cantilever (14).

This cam arrangement works in the following manner, referring now particularly to FIG. 2. In one of the two rectilinearly interchangeable positions, one of the bosses (13) is already pressed into one of the valleys (10) wherefrom it is displaceable by rectilinear pressure applied to the slider (2) in a direction towards the other such position. This causes the corresponding rib (8) to depress the boss in question (13) out of engagement in its valley (10) to allow the desired rectilinear motion towards the other rectilinearly interchangeable position. During this motion the second rib (8) increasingly depresses the second boss (13b) until it (the second boss (13) locates in the second valley (10) where the second boss (13) is retained by the spring action of the resilient cantilever (14).

In some cases, it is preferable to design the cantilever (14) with a raised band of reinforcement (15)—see FIG. 3.

Figure 7:
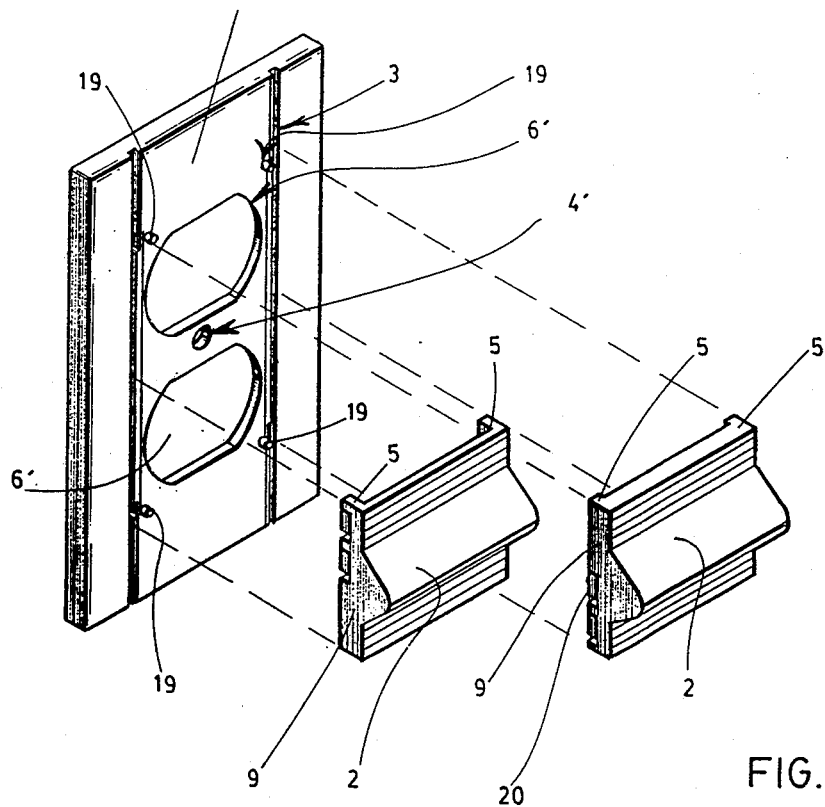
FIG. 7 is an exploded view of the embodiment of FIG. 5.
Figure 8:
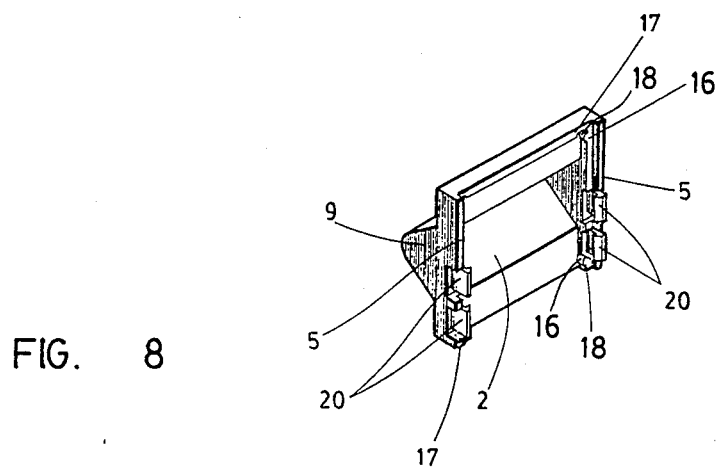
FIG. 8 is a reverse perspective view of the slider shown in FIG. 7.

Turning now to FIGS. 5, 7 and 8, a cover assembly for a standard double outlet is shown. As before, the cover plate (1) has a pair of parallel grooves (3) as the first guide means with interlocking tongues (5) on each slider (2) as second guide means. Here, again as before, the tongues (5) are merely a partial rearward extension of the vertical edges (9) of each slider. As is clearly shown there are two identical sliders (2) each independently moveable relative to the central screw hole (4') in the plate (1), from a proximal (rectilinearly interchangeable) position to a distal (rectilinearly interchangeable) position so that both orifices are covered (closed) by respective sliders (2) when in their proximal positions and uncovered (open) when in their distal positions. The equilibrium position of the slider is, in this case, halfway between the proximal and distal positions.

As before, the assembly has first and second cam means on the slider (2) and plate (1) respectively.

On the slider (see particularly FIG. 8), the first cam means comprises a bilateral rectangular configuration of two (proximal and distal) pairs of rounded protrusions (16) facing each other on both sides of the slider, each adjacent to an abutment end (17) thereby defining with these ends two corresponding pairs of recesses (18) (see FIG. 8).

The second cam means (on the plate) comprises one pair (per orifice) of cylindrical, resiliently deformable knobs (19) bilaterally flanking each orifice (6') and projecting outward of the plate (1). As illustrated, these knobs (19) are set back from the straight edge of the orifice (6') to allow unimpeded access to the outlet when the slider (2) is in the open position. In other words, in the line of rectilinear (longitudinal) motion, the knobs are clear of the orifices.

In this arrangement, the lateral (i.e. horizontal) distance between opposite protrusions (16) is slightly more than the lateral (horizontal) distance between opposite knobs (19) on the plate (1). As a result, the arrangement operates such that in one of the two rectilinearly interchangeable positions, a pair of knobs (on the plate) resides in a corresponding pair of cavities (on the sliders). These knobs are displaceable from this initial position by rectilinear pressure applied to the slider in a direction towards the second position. This causes the pair of protrusions which abut the knobs to depress (laterally) the knobs to allow the desired rectilinear motion until the second pair of protrusions contacts the same pair of knobs thereby depressing these knobs once again to allow location of the knobs in the second pair of cavities (18). Thus each slider has two pairs of protrusions (16) which alternately engage with the same pair of knobs (19) on the plate.

The above described operative sequence applies to either slider (2) since the two sliders (7) operate entirely independently.

Figure 6:
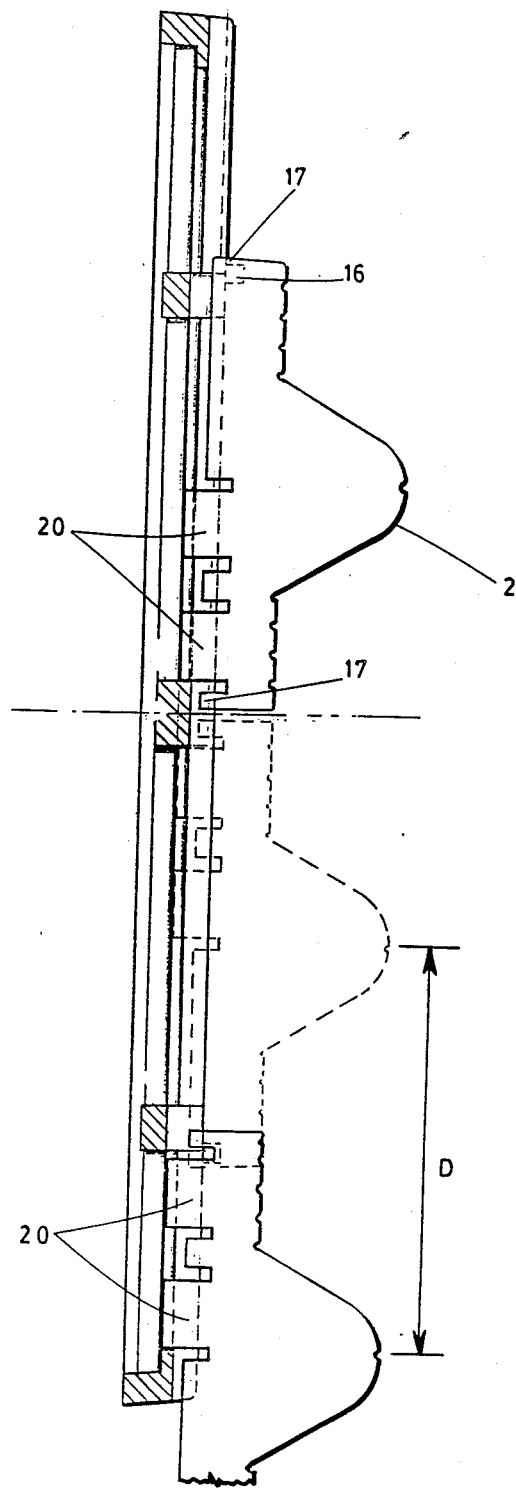
FIG. 6 is a cross-sectional view along the line YY of FIG. 5.

The movement of the lower slider (2) from a proximal position (shown in dotted outline) to a distal position (shown in full outline) is seen in FIG. 6 wherein D is the distance moved from the proximal position to the distal position.

Figure 9:
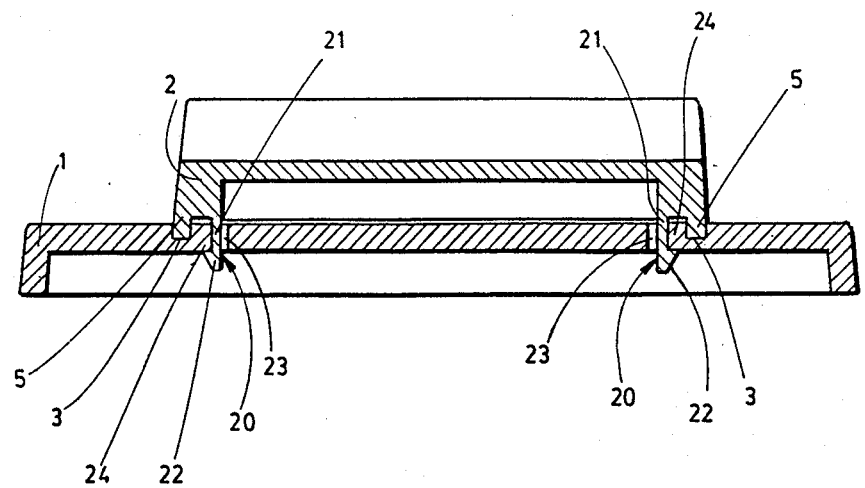
FIG. 9 is a cross-sectional view along the line AA of FIG. 1.
Figure 10:
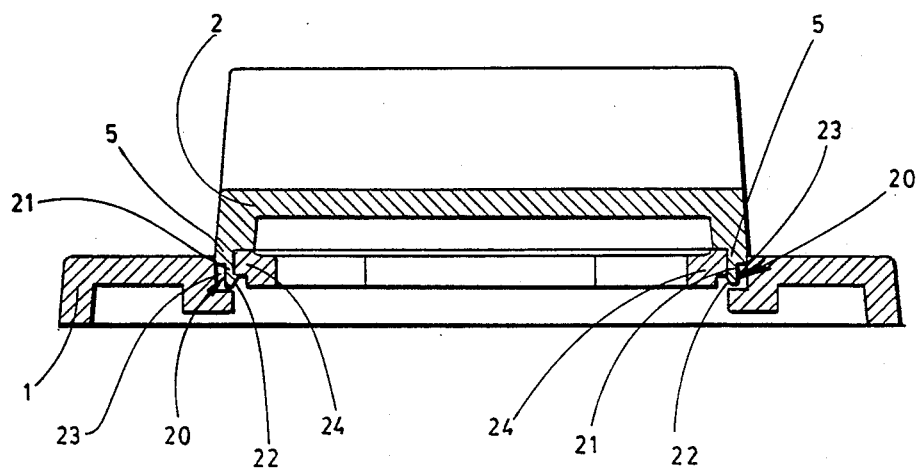
FIG. 10 is a cross-sectional view along the line MM of FIG. 5.

Turning now to FIGS. 9 and 10, two kinds of clip are shown for retaining the first guide means (in this case the grooves (3) in the plate (1)) in sliding relationship with the second guide means (here the tongues (5) of the sliders (2)).

As in shown in FIGS. 9 and 10, the preferred clip comprises at least one pair of symmetrical, resiliently deformable, L-shaped elements (20) each having a stem portion (21) extending rearwardly from the inner face of the slider (2) and a leg portion (22) extending perpendicularly from the stem portion (21). In the plate there is at least one pair of channels (23) each of which pairs receives a corresponding pair of L-shaped elements. Each channel has a rearward facing stepped portion (24) for retention of the leg portion (22) of the L-shaped element (20). The slider is mounted on the plate by pressing the L-shaped elements (20) into the channels (23). This takes advantage of their resiliently deformable nature because during the pressing action, the elements (20) deform to allow their entry into respective channels (23) and then reform so that the leg portions (22) are retained by the stepped portions (24).

Although the channels (23) may be separate from the grooves (3) as in FIG. 9, the channels (23) may either form part of or be identical to the grooves (3) in the plate.

In the case where the channels (23) are the same as the grooves (3), the L-shaped elements (20) are merely rearward extensions of the tongues (5) as shown in FIG. 10.

The abovementioned stepped portion (24) may be merely the inward face of the plate if the channel (23) passes the whole way though the plate as, for example, in FIG. 9.

Although FIGS. 9 and 10 are cross sections of the embodiments respectively shown in FIGS. 1 and 2, the type of clip shown is not restricted to those embodiments and may be selected independently of the type of electrical fixture being covered.

Variations of the foregoing are envisaged such as assemblies for two outlets and one switch or for a plurality of outlets and switches alone or together in any orientation.

The shape of the plate and the slider may also vary from the rectangular examples shown in the drawings. E.g. round plates are envisaged.

Although the present invention has been described hereinabove by means of preferred embodiments thereof, it should be pointed out that any modification to these preferred embodiments, within the scope of the appended claims, is not deemed to change or alter the nature of the invention.

I claim:

1. An exterior cover assembly for an electrical box containing at least one electrical component having at least one screw hole, the assembly comprising:
   a cover plate having one orifice for each electrical component in said electrical box and having a screw hole for each screw hole in said at least one electrical component;
   a slider mounted over each orifice outwardly of said cover plate;
   each said slider having an inner face and an outer face;
   a first guide means on said cover plate;
   a second guide means on said slider;
   said second guide means is a pair of parallel tongues extending rearwardly from said inner face of said slider along at least a portion thereof, and said first guide means is a pair of parallel grooves bilaterally flanking said orifice in said cover plate, and wherein each individual tongue of said pair of parallel tongues fit in a respective individual groove of said one pair of parallel grooves to allow rectilinear sliding motion of said slider relative to said plate; and
   a clip for retaining said first guide means in sliding relationship with said second guide means to allow guided, rectilinear displacement of said slider in a plane parallel to said cover plate.

2. An assembly according to claim 1, wherein said clip comprises:
   at least one pair of symmetrical, resiliently deformable, L-shaped elements extending from said sliders, each having a stem portion extending rearwardly from said inner face of said slide and a leg portion extending perpendicularly from said stem portion;
   at least one pair of channels in said plate, each pair of channels receive one pair of said at least one pair of elements, each pair of channels having a rearward facing stepped portion for retention of said leg portion;
   wherein each said slider is mounted on said plate by pressing said L-shaped elements into said pair of channels which, during pressing, said L-shaped elements deform to allow entry of said L-shaped elements into said pair of channels and then reforms from its deformed state so that said leg portions are retained by said stepped portions.

3. An assembly according to claim 2, wherein each slider is moveable between two rectilinearly interchangeable positions and wherein the inner face of each slider further comprises a first and a second cam means, said first cam means interacting with said second cam means on said plate for reversably retaining the slider in either one of said rectilinearly interchangeable positions.

4. An assembly according to claim 3, wherein the first cam means comprises a pair of diametrically opposed ribs projecting rearwardly from said inner face of said slider and parallel to said pair of tongues, at least one valley and at least one end abutment of an inner surface of said slider, each pair of ribs sloping from a central portion of said slider to a maximum rearward extent adjacent to said at least one valley in said slider and on said at least one end abutment on said inner surface of said slider, and wherein said second cam means comprises a pair of diametrically opposed rounded bosses, each of said pair of rounded bosses being disposed on an end of a resiliently deformable cantilever such that, in a first of said rectilinearly interchangeable positions, a first boss is pressed into a first valley wherefrom said first boss is displaceable by rectilinear pressure applied to said slider in a direction towards the second position, causing a first rib to depress the first boss out of engagement in said first valley to allow said rectilinear motion towards the second rectilinearly interchangeable position, during which motion said second rib increasingly depresses said second boss until said second boss locates in a second valley where said second boss is retained by action of said resilient cantilever.

5. An assembly according to claim 4, wherein said electrical component is a toggle switch unit including a switch actuator having two centrally positioned screw holes respectively above and below and equidistant from said switch actuator which resides in one of two rectilinearly interchangeable positions, said switch being off in one position and on in the other position, wherein:
   said cover plate includes one rectangular orifice for passage of said switch actuator which is completely covered by the slider; and
   said inner face of the slider additionally comprises a cavity for accommodating said switch actuator such that said rectilinear displacement causes said actuator to move from one of said positions to the other of said positions.

6. An assembly according to claim 3, wherein:
   the first cam means comprises a bilateral rectangular configuration of two pairs of rounded protrusions each adjacent to an abutment end to define a cavity therebetween; and
   the second cam means comprises a pair of cylindrical, resiliently deformable knobs, bilaterally flanking and rectilinearly clear of the orifice and projecting outward of the plate;
   wherein the lateral distance between opposite protrusions is slightly more than the lateral distance between said pair of knobs such that in a first of said rectilinearly interchangeable positions, said pair of knobs reside in a first pair of said cavities wherefrom said pair of knobs are displaceable by rectilinear pressure applied to said slider in a direction towards the second position causing a first pair of said protrusions to depress the pair of knobs to allow said rectilinear motion until the second pair of said protrusions contacts the pair of knobs thereby depressing said pair of knobs to allow lotion of the pair of knobs in the second pair of cavities.

7. An assembly according to claim 6, wherein said electrical component is a double outlet unit, the unit having two outlets respectively equidistantly above and below a central screw hole, wherein:
   said cover plate has two orifices, one for each outlet; and
   two identical sliders each having, relative to the central screw hole, a proximal and a distal rectilinearly interchangeable position, said two orifices being closed when said tow identical sliders are at their proximal positions and open at their distal positions.

8. An assembly according to claim 7, wherein said L-shaped elements are rearward extensions of said pair of tongues and wherein said channels are said pair of grooves.

9. An exterior cover assembly for an electrical box containing a double outlet unit, said double outlet unit having two outlets respectively equidistantly above and below a central screw hole in said unit, the assembly comprising:

a cover plate having two orifices, one for each outlet and having a central screw hole, registerable with the central screw hole in said outlet unit:

two identical sliders, each mounted over a respective orifice outwardly of the cover plate, each slider having an inner face and an outer face and being independently moveable relative to the central screw hole from a proximal to a distal rectilinearly interchangeable position, said two orifices being closed when said sliders are at their proximal positions and open at their distal positions;

a first guide means on said cover plate;

a second guide means on said sliders;

said second guide means is a pair of parallel tongues extending rearwardly from the inner face of said slider along at least a portion thereof; and said first guide means is a pair of parallel grooves bilaterally flanking each of said orifices; wherein said tongues fit in said two grooves to allow rectilinear sliding motion of said pair of sliders relative to said pair of plates, and a clip for retaining said first guide means in sliding relationship with said second guide means to allow guided, reversible, rectilinear displacement of each slider in a plane parallel to said plate from said proximal position to said distal position.

10. An exterior cover assembly for an electrical box containing at least one toggle switch unit of standard design having two centrally positioned standard screw holes respectively above and below and equidistant from a switch actuator residing in one of two rectilinearly interchangeable positions, the switch being off in one position and on in the other position, the assembly comprising:

a cover plate having one standard, rectangular orifice for passage of each switch actuator and having two corresponding standard screw holes per unit:

a slider having an inner face and an outer face mounted over and completely covering each orifice forward of the cover plate so that said inner face of the slider faces the plate;

a first guide means on said cover plate, a second guide means on said slider;

said second guide means is a pair of parallel tongues extending rearwardly from the inner face along at least a portion thereof; and said first guide means is a pair of parallel grooves bilaterally flanking each of said orifices; and wherein said tongues fit in said grooves to allow rectilinear sliding motion of said slider relative to aid plate; and a clip for retaining said first guide means in sliding relationship with said second guide means to allow guided, rectilinear displacement of said slider in a plane parallel to said plate; and wherein:

the inner face of the slider additionally comprises a cavity for accommodating the switch actuator such that said rectilinear displacement causes the actuator to move from one of said positions to the other of said positions.

11. An exterior cover assembly for an electrical box containing at least one toggle switch unit of standard design having two centrally positioned standard screw holes respectively above and below and equidistant from a switch actuator residing in one of two rectilinearly interchangeable positions, the switch being off in one position and on in the other position, the assembly comprising:

a cover plate having one standard, rectangular orifice sized to receive and let pass the switch actuator, and two standard screw holes of the switch unit when the switch actuator is received in the orifice;

a slider having an inner face and an outer face mounted over and completely covering the orifice forward of the cover plate so that said inner face of the slider faces the plate;

means for retaining and guiding the slider on said cover plate to allow guided displacement of said slider over the corresponding orifice;

a first guide mean son said cover plate;

a second guide means on said slider; and said second guide means is a pair of parallel grooves bilaterally flanking said orifice, and said first guide means comprises tongues disposable in said groove to allow rectilinear sliding motion of said slider relative to said plate;

a clip for retaining said first guide mean sin sliding relationship with said second guide means to allow guided, rectilinear displacement of said slider in a plane parallel to said plate; and the inner face of the slider additionally comprising a cavity for accommodating the switch actuator such that said rectilinear displacement causes the actuator to move from one of said positions to the other of said positions.

* * * * *